M. E. KENNEY.
SAW FILING MACHINE.
APPLICATION FILED OCT. 26, 1915.

1,216,137.

Patented Feb. 13, 1917.

WITNESS
Frank H. Fowler

INVENTOR
Myron E. Kenney
BY
ATTORNEY

UNITED STATES PATENT OFFICE.

MYRON E. KENNEY, OF SAUK, WASHINGTON.

SAW-FILING MACHINE.

1,216,137.  Specification of Letters Patent.  Patented Feb. 13, 1917.

Application filed October 26, 1915. Serial No. 57,907.

*To all whom it may concern:*

Be it known that I, MYRON E. KENNEY, a citizen of the United States, and a resident of Sauk, in the county of Skagit and State of Washington, have invented certain new and useful Improvements in Saw-Filing Machines, of which the following is a full, true, and exact specification.

My invention relates to saw filing machines, and more particularly to those used for automatically filing or grinding circular saws and has for its principal object to provide a tooth feeding finger which is applicable for use with radial insert toothed saws. In filing saws of this particular type a special shaped finger is required because of the peculiar angular shape of the saw tooth. Heretofore saws having radial insert teeth could not be sharpened on an automatic filer as the usual finger would catch upon the teeth instead of slipping over them as is necessary in the feeding of the teeth to the grinding wheel.

Other objects will appear as my invention is more fully explained in the following specification, illustrated in the accompanying drawings and pointed out in the appended claims.

Figure 1:
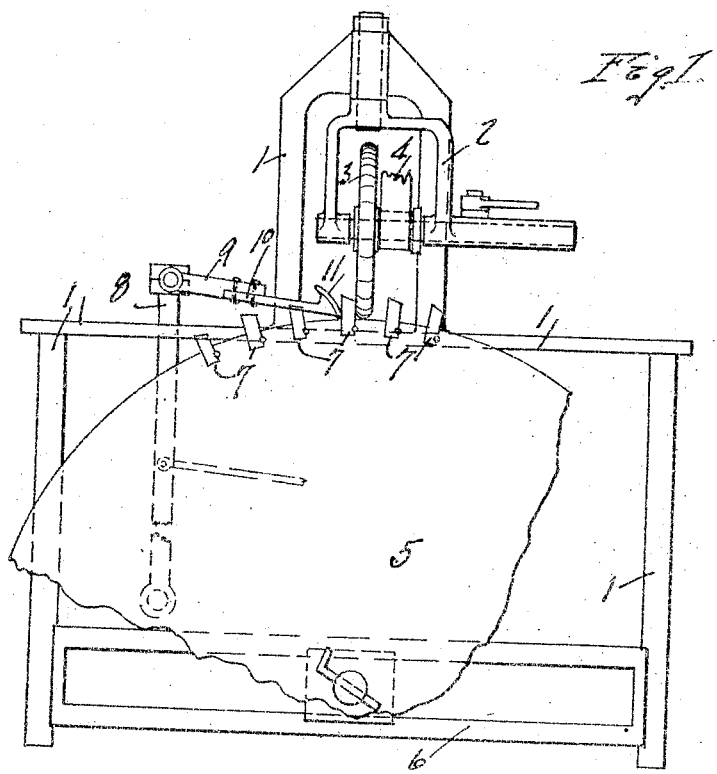
Figure 2:
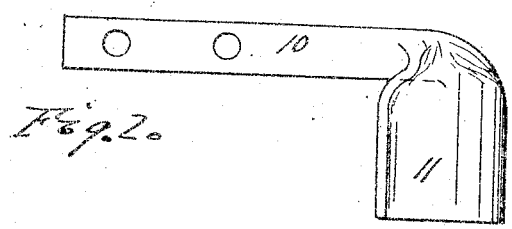
Figure 3:
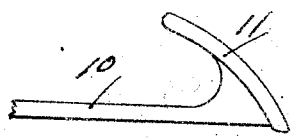

In the drawings, Figure 1 is a fragmentary elevation with parts omitted of an automatic filer showing my improved finger in operative position. Fig. 2 is an enlarged plan of my feed finger. Fig. 3 is a side elevation of Fig. 2.

Referring more particularly to the drawings, numeral 1 indicates an automatic grinding machine frame upon which is mounted a swivel grinding head 2. An emery wheel 3 is mounted in the head 2 and driven by a belt 4. A saw 5 to be ground is revolubly mounted on an adjustable spindle frame 6. Saw 5 has radial insert teeth 7 around its periphery. A feed arm 8 is automatically operated in conjunction with the grinder head 2 so as to feed the saw teeth 7 to the grinder wheel 3. Pivoted upon feed arm 8 is a finger holder 9 to which the stem of my improved finger 10 is secured. Finger stem 10 has a segmental outer end 11 which is offset with respect to the said stem and which is set at an angle to the plane of the stem so that it will ride the teeth of the saw on the return stroke. The function of the finger is to revolve the saw a single tooth at a time and to hold the tooth being sharpened against the emery wheel. In reaching back to advance another tooth into position, the finger end 11 rides back over the point of the tooth to the left of the one being ground and drops into the space behind it. Upon the advance stroke of the finger, a new tooth is shoved into position to be sharpened. The peculiar shape of my finger end enables it to be used with the radial insert teeth whereas others in general use catch the said teeth on the return stroke instead of riding over them. The advent of the radial insert tooth is a comparatively recent improvement in saws and requires special devices such as my finger.

While I have shown a particular form of embodiment of my invention, I am aware that many minor changes therein will readily suggest themselves to others skilled in the art without departing from the spirit and scope of the invention, and I therefore desire to avoid being limited to the exact form shown and described except as required by the scope of the appended claims. Having described my invention, what I claim as new and desire to protect by Letters Patent, is—

Claim:

In a saw filing machine for filing radial insert teeth, the combination of an abrasive wheel which files the radial face of a saw tooth, a feed and holding means, whereby the saw is advanced and the tooth is held against the abrasive wheel; said means including a reciprocating holder feed finger, feed finger means removably attached to said holder, the said finger means including a segmental tip integral with a stem and whose lower end projects slightly below the underside of said stem and which curves upward and backward with respect to said stem and which is offset with respect to said stem, whereby the forward end of said tip holds the tooth against the abrasive wheel and the concaved side may ride freely over the back of the adjacent teeth.

MYRON E. KENNEY.